US010045372B2

(12) United States Patent
Auvray

(10) Patent No.: US 10,045,372 B2
(45) Date of Patent: Aug. 7, 2018

(54) MANAGEMENT OF THE USE OF A GATEWAY BY A PLURALITY OF TERMINALS

(71) Applicant: Orange, Paris (FR)

(72) Inventor: Vincent Auvray, Tonneville (FR)

(73) Assignee: ORANGE, Paris (FR)

(*) Notice: Subject to any disclaimer, the term of this patent is extended or adjusted under 35 U.S.C. 154(b) by 43 days.

(21) Appl. No.: 14/427,578

(22) PCT Filed: Sep. 4, 2013

(86) PCT No.: PCT/FR2013/052032
§ 371 (c)(1),
(2) Date: Mar. 11, 2015

(87) PCT Pub. No.: WO2014/041278
PCT Pub. Date: Mar. 20, 2014

(65) Prior Publication Data
US 2015/0237650 A1 Aug. 20, 2015

(30) Foreign Application Priority Data
Sep. 11, 2012 (FR) ..................... 12 58514

(51) Int. Cl.
*H04W 74/00* (2009.01)
*H04W 52/02* (2009.01)
(Continued)

(52) U.S. Cl.
CPC ......... *H04W 74/004* (2013.01); *H04W 28/18* (2013.01); *H04W 52/0209* (2013.01); *H04W 88/04* (2013.01); *H04W 88/16* (2013.01)

(58) Field of Classification Search
CPC .......... H04W 74/004; H04W 52/0209; H04W 28/18; H04W 88/04; H04W 88/16
See application file for complete search history.

(56) References Cited

U.S. PATENT DOCUMENTS 6,115,740 A * 9/2000 Mizutani ............ H04N 7/17336
348/E7.073
7,778,260 B2 * 8/2010 Sturniolo ................ H04W 8/02
370/310
(Continued)

FOREIGN PATENT DOCUMENTS

EP 2391179 A1 11/2011
WO 2007095546 A2 8/2007
WO 2008011111 A2 1/2008

OTHER PUBLICATIONS

International Search Report dated Oct. 15, 2013 for corresponding International Application No. PCT/FR2013/052032, filed Sep. 4, 2013.
(Continued)

*Primary Examiner* — Mounir Moutaouakil
(74) *Attorney, Agent, or Firm* — David D. Brush; Westman, Champlin & Koehler, P.A.

(57) ABSTRACT

Management of the use of a gateway by a plurality of terminals. A method is provided for managing the use of a gateway capable of interconnecting networks. The gateway is capable of receiving requests to access a network from a plurality of terminals. The maximum number of simultaneous accesses via the gateway varies with time.

9 Claims, 3 Drawing Sheets

(51) Int. Cl.
*H04W 28/18* (2009.01)
*H04W 88/16* (2009.01)
*H04W 88/04* (2009.01)

(56) References Cited

U.S. PATENT DOCUMENTS

| | | | | |
|---|---|---|---|---|
| 8,224,983 | B2* | 7/2012 | Ta | H04L 41/0893 |
| | | | | 709/226 |
| 8,339,948 | B2* | 12/2012 | Ramprashad | H04L 47/10 |
| | | | | 370/230 |
| 2005/0168323 | A1* | 8/2005 | Lenoir | H04N 5/765 |
| | | | | 340/5.74 |
| 2010/0166170 | A1 | 7/2010 | East et al. | |
| 2011/0075613 | A1* | 3/2011 | Yuan | H04W 72/1215 |
| | | | | 370/329 |
| 2012/0040606 | A1* | 2/2012 | Verfuerth | H05B 37/0218 |
| | | | | 455/7 |

OTHER PUBLICATIONS

English translation of the Written opinion dated Mar. 11, 2015 for corresponding International Application No. PCT/FR2013/052032, filed Sep. 4, 2013.

* cited by examiner

MANAGEMENT OF THE USE OF A GATEWAY BY A PLURALITY OF TERMINALS

CROSS-REFERENCE TO RELATED APPLICATIONS

This Application is a Section 371 National Stage Application of International Application No. PCT/FR2013/052032, filed Sep. 4, 2013, the content of which is incorporated herein by reference in its entirety, and published as WO 2014/041278 on Mar. 20, 2014, not in English.

TECHNICAL FIELD

The invention relates to a method for managing the use of a gateway by a plurality of terminals.

The terminal in question includes physical and software resources including a processor.

The gateway in question is a terminal which functions as an interface between a local network of a user and an access network of an operator. Such a gateway is intended for the exchange of a data stream between a client terminal connected to the local network for data transmission and the external access network for data transmission.

The gateway in question is a physical and software resource, or a purely software resource. When it is purely software, the program in question is stored on a data processing device equipped with a processor capable of executing the program. For example, the device in question can be a telephone, a stationary or mobile computer, etc.

PRIOR ART

Nowadays, new mobile terminals include a program providing a gateway function. These mobile terminals offer the possibility of transporting the gateway at will and using it in any location, via different terminals. The devices concerned are especially mobile phones of smartphone type. In this way, the smartphone (and, it is understood, the gateway), interconnects the terminal and the access network.

The gateway in question often limits the maximum number of client terminals that are connected to it simultaneously, in order to provide a minimum quality of service. Some gateways offer a maximum of 5 (five) simultaneous connections, for example.

However, the gateway in question, unlike conventional home gateways, is bound to move. As a consequence, the available bandwidth fluctuates over time as a function of the place in which the gateway is situated. It can happen that the current available bandwidth is inadequate to provide an adequate quality of service to all the terminals connected to the gateway at a given instant.

In addition, the gateway in question can be powered by way of a battery. Its autonomy therefore varies over time. Too low a battery level can have negative consequences for the quality of service, particularly when the number of simultaneous connections is too great.

In general, the inventors have observed that the gateway comprises physical and software resources contributing to the communication of data between a terminal and the network, and that the fluctuations in the state of all or part of such resources influence the quality of the service delivered via the gateway.

The invention presents a solution that does not have the drawbacks of the prior art.

SUMMARY

A method is provided for managing the use of a gateway capable of interconnecting networks, said gateway being capable of receiving requests to access a network from terminals, a maximum number of simultaneous accesses being defined in such a way as to provide a given quality of service, characterized in that the maximum number of simultaneous accesses to the network via the gateway varies over time.

The maximum number of simultaneous connections is not fixed as in the prior art but can vary over time. A quality of service can therefore be provided by modifying the maximum number of simultaneous connections where necessary.

According to a first particular mode of implementation of the invention, the number varies over time as a function of the state of all or part of the physical and/or software resources of the computer system (described below) contributing to the communication of data between a terminal and the network. Thus, according to the invention, the number of network accesses via the gateway is chosen, for example, as a function of the bandwidth, the radio reception quality, the latency of the mobile network and more generally the state of the resources of the gateway, or of the network, having an impact on the quality of the interconnection and therefore the quality of service at the level of the terminal.

In a variant of this mode a physical and/or software resource is a resource included in the gateway, the resource being included in the following list: a processor, a battery, a storage memory.

In another variant of this mode, which may be implemented as an alternative to or cumulatively with the previous variant, the resource is a bandwidth of the network.

According to a second particular mode of implementation of the invention, which may be implemented as an alternative to or cumulatively with the previous one, the number varies as a function of the time of use of the gateway.

In a variant relating to the first and/or second mode, at least one connection in progress is disconnected if at least one physical and/or software resource is faulty. A fault takes place for example, when a characteristic value of a resource is below a predefined threshold. For example, if the resource is a network, the characteristic value is the bandwidth available on the network.

In a variant relating to the first and/or second mode, at least one terminal takes priority over other terminals; in this configuration, the disconnection concerns said other terminals. Thus the owner of the gateway and owner of a so-called priority terminal, sharing the gateway with other users of terminals, is assured that they will be able to communicate with their terminal via the gateway as a matter of priority.

In a hardware aspect, the invention deals with a computer program including instructions for the implementation of the method when this program is executed by a processor. Such a program can use any programming language. It may be downloaded from a communication network and/or stored on a computer-readable medium.

In another hardware aspect, the invention deals with a terminal comprising a gateway capable of interconnecting networks, said gateway comprising physical and/or software resources and being capable of receiving requests to access a network from terminals, a maximum number of simultaneous accesses being defined in such a way as to provide a given quality of service, characterized in that it comprises a module for making the maximum number of accesses to the network via the gateway vary over time.

In another hardware aspect, the invention deals with a gateway capable of interconnecting networks, said gateway comprising physical and/or software resources and being capable of receiving requests to access a network from terminals, characterized in that it comprises a module for making the maximum number of accesses to the network via the gateway vary over time.

The invention will be better understood upon reading the following description, given by way of example and with reference to the appended drawings.

FIGURES

FIG. 1 represents a computer system on the basis of which two embodiments of the invention will be illustrated.

FIGS. 2a and 2b schematically represent the circuits included in a terminal and in a smartphone, respectively.

DETAILED DESCRIPTION OF AN EXEMPLARY EMBODIMENT ILLUSTRATING THE INVENTION

Figure 1:
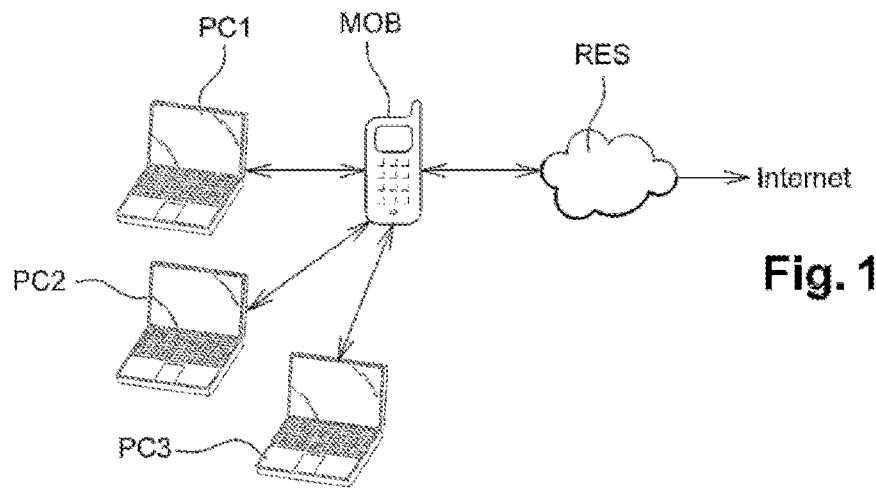

FIG. 1 represents a system SYS comprising client terminals PCn illustrated by portable computers, namely a first computer PC1, a second computer PC2, and a third computer PC3.

Figure 2A:
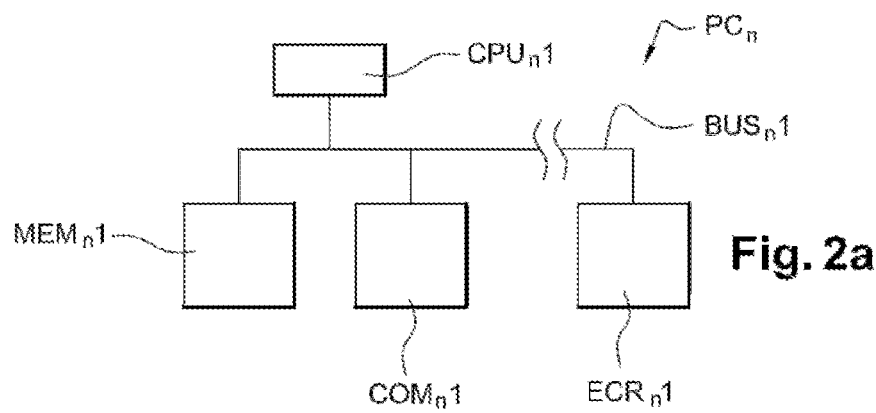
Figure 2B:
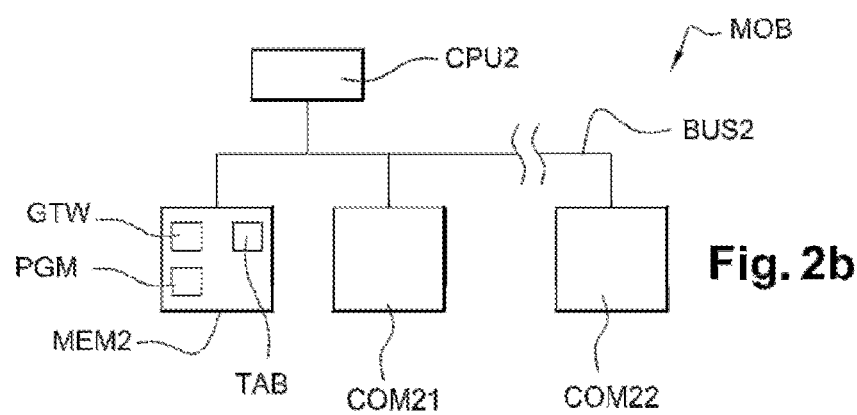

The client terminals are equipped with physical and software resources. In this case, with reference to FIG. 2, the client terminals PCn (n=1, 2, 3, etc.) respectively include
- a processor CPUn1,
- a storage module MEMn1,
- a restoration module ECRn1 illustrated by a screen,
- a communication module COMn1 for establishing a connection with the outside world.

In our example, the communication module includes a client program, making it possible to establish a connection, the terminal, known as client terminal, and a gateway GTW of software type stored on a data processing device. The device in question is for example a telephone, a stationary or mobile computer etc. In our example, the data processing device MOB is a smartphone.

The smartphone MOB includes:
- a processor CPU2, known as the second processor,
- a storage module MEM2, known as the second storage module, wherein the program GTW having the function of gateway is stored, hereinafter designated by the term "gateway",
- a communication module COM21, known as the second communication module of a first type, for establishing a connection with the smartphone MOB,
- a communication module COM22, known as the second communication module of a second type, for establishing a connection with an access network illustrated by a 3G network.

In the client terminals PCn and in the smartphone MOB, the modules are linked to the processor by way of a first bus BUSn1 and a second bus BUS2, respectively. It will be recalled that a bus has the purpose of ensuring the transfer of digital data between the various circuits of a client terminal. In our example, the bus in question includes a data bus and a control bus.

It should also be noted that, in our example, the storage modules described above are permanent memories for example of ROM type (English acronym for Read Only Memory) and that the client terminal and the smartphone also include a respective access memory (not represented) serving to store in a non-permanent way computational data used in particular during the implementation of the method.

A first embodiment will be described with reference to FIG. 3.

Here it is assumed that the access network is a 3G network and that the gateway provides an interconnection between a WIFI network and a network RES of 3G type. However, the invention is not limited to these two networks but can extend to other communication networks (2G (contraction of "second generation", Bluetooth, LTE, Wi-Max, etc.).

In this mode, a first phase PH1 consists in defining values, for example in a table TAB stored in the second memory MEM2, indicating the number of simultaneous connections as a function of a score relating to the quality, designated hereinafter by the expression "quality score". This score is the result of a computation that is a function of the state of the physical and/or software resources, at a given moment, of the gateway contributing to the communication of data between a terminal and the network, namely the bandwidth, and/or the state of the battery, and/or the state of the volatile memory of the gateway etc.

The quality score in question is, in our example, expressed as a percentage. In this example, the higher the percentage, the higher the quality of service.

Note that any method of obtaining the score may be used. In our example:
- if all the resources mentioned above are above a predefined threshold, the quality of service score is 100%. In this configuration, five simultaneous connections are authorized;
- if the characteristic value of one of the resources (for example the bandwidth on the network RES) is below a threshold, the quality of service score is 80%. In this configuration, four simultaneous connections are authorized;
- if the characteristic value of two resources (for example the bandwidth and the battery) are below their respective thresholds, the quality of service score is 60%. In this configuration, three simultaneous connections are authorized;
- and so on, a quality of service score is estimated as a function of values of parameters linked to the resources mentioned above.

The following table TAB summarizes this method of computing the score:

| Quality of service | Maximum number of simultaneous connections |
| --- | --- |
| 100% | 5 |
| 80% | 4 |
| 60% | 3 |
| 40% | 2 |
| 20% | 1 |

In order to simplify the disclosure, a single resource will be used to illustrate the invention. The resource in question is the current bandwidth available on the 3G network. In this simplified example,
the score relating to quality of service is 100% if the bandwidth on the Orange 3G network is above 3.2 Mbits/s; it will be recalled that in this case five simultaneous connections are authorized.

the score is 80% if the bandwidth on the Orange 3G network is between 2.6 Mbits/s and 3.2 Mbits/s; in this case, only four simultaneous connections are authorized.

the score is 60% if the bandwidth on the Orange 3G network is between 2.1 Mbits/s and 2.6 Mbits/s; in this case, only three simultaneous connections are authorized.

the score is 40% if the bandwidth on the Orange 3G network is between 1.6 Mbits/s and 2.1 Mbits/s; in this case, only two simultaneous connections are authorized.

the score is 20% if the bandwidth on the Orange 3G network is between 1.1 Mbits/s and 1.6 Mbits/s; in this case, only one connection is authorized.

The following table summarizes this example

| Bandwidth (Mbits/s) | Maximum number of simultaneous connections |
|---|---|
| 3.2 | 5 |
| 2.6 | 4 |
| 2.1 | 3 |
| 1.6 | 2 |
| 1.1 | 1 |

Note that any intervals of bandwidth may be used here; other intervals with other values of bandwidth could have been used.

A second phase PH2 deals with the management of access to the gateway according to a first embodiment of the invention.

Figure 3:
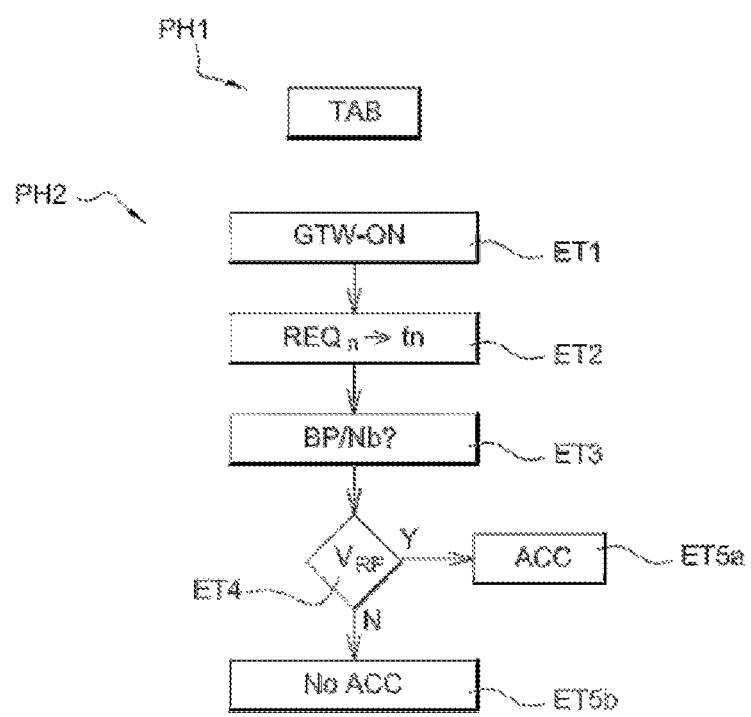
FIG. 3 is a flow chart illustrating a first embodiment of the method of the invention.

In this second phase PH2, a program PGM is executed; this results in an algorithm illustrated in FIG. 3.

In this algorithm, in a first step ET1 (GTW-ON), the gateway is powered up.

In a second step ET2 (REQn→tn), access requests REQ made by the client terminals are received by the gateway as time goes by at instants tn.

In our example, in a third step ET3 (BP/Nb?), the program retrieves the quality score described above as a function, in our example, of the value of the bandwidth BP. The program also retrieves the current number Nb of simultaneous accesses.

Once these parameters have been retrieved, in a fourth step ET4 (VRF), the program PGM knowing the current number of simultaneous connections, verifies the table TAB defined in the first phase PH1 and gives access or refuses access to the client terminal if the quality of service score (characterized by the bandwidth, the reception quality, etc.) is adequate or inadequate, respectively, for all of the client terminals, i.e. both the client terminals with an effective connection in progress and the client terminal from where the connection request originates.

To do this, the program consults the table TAB.

If the bandwidth is sufficient, access is authorized in the fifth step ET5 (ACC); otherwise, access is refused in the fifth step ET5b (NoACC).

The program optionally sends a message to the client terminal concerned to inform the latter that the connection has been authorized or refused.

Figure 4:
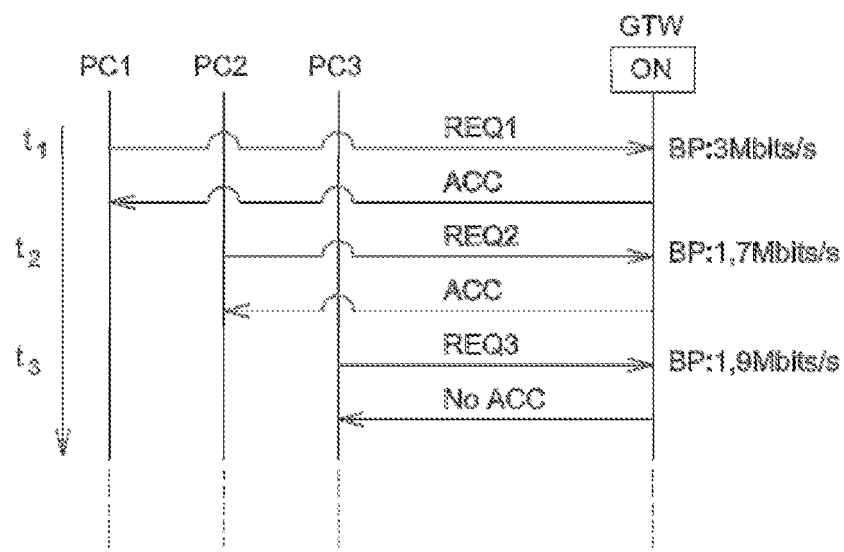
FIGS. 4 and 5 illustrate a few exchanges of data for the purposes of illustration of the embodiment of the invention.
Figure 5:
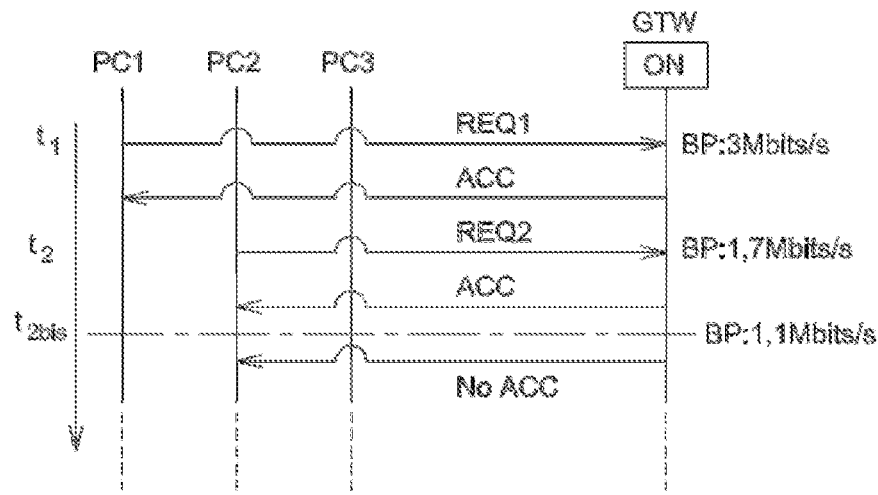

This first embodiment is illustrated in FIGS. 4 and 5. These figures show exchanges of data between the various client terminals and the gateway. A time axis "t" makes it possible to pinpoint a given exchange in time.

The terminals PC1, PC2, PC3 described above will initiate requests RQ1, REQ2 and REQ3, respectively, asking to access the access network RES via the gateway GTW.

In the second step ET2 (REQ1→t1) described above, the gateway GTW receives a first access request REQ1 made by the first computer PC1 at a time t1. In this configuration, in the third step ET3 (BP/Nb ?), the program retrieves the current bandwidth; we will consider that the bandwidth is 3 Mbits/s. At this stage, there is no connection in progress. After consultation of the table TAB, the program deduces therefrom that the bandwidth is therefore adequate. The program PGM therefore grants the first terminal access to the network via the gateway in the fifth step ET5a (ACC).

In a new second step ET2 (REQ2→t2), the gateway then receives a second access request REQ2 made by the second client terminal PC2 at a time t2. In this configuration, in the third step ET3 (BP/Nb ?), the program retrieves the current bandwidth; we will consider that the bandwidth is 1.7 Mbits/s. At this stage, a connection is in progress. The bandwidth is therefore adequate for two client terminals. The program PGM therefore grants the second client terminal PC2EC access to the network via the gateway in the fifth step ET5a (ACC).

In a new second step ET2 (REQ3→t3) the gateway then receives a third access request REQ3 made by the third client terminal PC3 at a time t3. In this configuration, in the third step ET3 (BP/Nb ?), the program retrieves the current bandwidth; we will consider that the bandwidth is 1.9 Mbits/s. At this stage, two connections are in progress. The bandwidth is therefore not adequate for three simultaneous accesses. The program PGM therefore refuses the third client terminal PC3 access to the network in the fifth step ET5b (No ACC).

A first variant of this first mode is described with reference to FIG. 5. In this variant, the obtaining of the bandwidth, and more generally of the current quality of service score is carried out at times independent of the times of reception of access requests.

Consider for example that at the time t2bis, situated between the times t2 and t3, the bandwidth decreases so that it is no longer adequate to provide two simultaneous connections; for example the bandwidth changes from 1.7 Mbits/s to 1.1 Mbits/s at the time t2bis. In this configuration, the program can cut access to at least one connected client terminal.

The management of disconnection of access can take any form. For example, the connection to be disconnected can be chosen at random. The connection to be disconnected can also be managed as a function of the known principle of "first in/first out" or "last in/first out".

Provision may be made for other disconnect rules. For example, the program notifies the client terminals that the bandwidth is no longer adequate. In this way, a connected client terminal can decide to disconnect the connection spontaneously, thus freeing up a connection to the gateway.

In a second variant of this first mode, a part of the bandwidth is allocated to the owner of the gateway in order for the latter to take priority over the other client terminals. Thus, if a disconnection must be carried out, the latter will, preferably, affect a client terminal other than the priority client terminal.

Let us consider that the first client terminal PC1 has priority over the other client terminals as regards the gateway, for example because the user of this first client terminal is also the owner of the gateway. Two scenarios then arise:

either a bandwidth is constantly allocated to the first client terminal PC1; in this case, the number of simultaneous connections will include the first client terminal PC1 even if the latter is not connected to the gateway.

or the bandwidth is allocated to the first client terminal PC1 on the fly, i.e. following the receipt of a connection request made by the first client terminal PC1; in this case, when the first client terminal requires a connection with the gateway, if the bandwidth is not adequate, the program disconnects the access to at least one client terminal in the process of connecting with the gateway in order to free up sufficient bandwidth for the first client terminal EC to communicate via the gateway.

A second embodiment will now be described. This second embodiment can be implemented in isolation or in combination with the first embodiment.

In this second embodiment, the maximum number of connections is a function of the time of use of the gateway. For example, when the gateway is located at the workplace of the user of the smartphone, five connections are authorized, for example, because the workplace is located in a large urban area with optimal network coverage. In the contrary case, when the gateway is located in the home, three connections are authorized for example because the home in question is located in a rural area with poor network coverage.

The modification of the maximum number can be performed either manually, or automatically by way of a geolocation program capable of geographically locating the gateway and a program capable of modifying the number as a function of the location as a consequence. The parameterization is performed beforehand by the user for example, or by the telecommunications operator, or any other third party with parameterization rights. For example, for the operator to optimize their network, maximize their profits etc., they will be able to remotely influence the maximum number of connections, the duration of these connections and any other parameters related to the service.

Although the present disclosure has been described with reference to one or more examples, workers skilled in the art will recognize that changes may be made in form and detail without departing from the scope of the disclosure and/or the appended claims.

The invention claimed is:

1. A method for managing use of a mobile gateway capable of interconnecting a first network and a second network, wherein bandwidth on said second network varies over time, comprising:
 receiving by said mobile gateway from the first network, requests to access said second network from a plurality terminals;
 defining, by said mobile gateway, a maximum number of possible simultaneous accesses by the terminals in the first network so as to provide a given quality of service, wherein the maximum number is independent of current simultaneous accesses by the terminals on the first network, and wherein the maximum number of possible simultaneous accesses varies over time as a function of the bandwidth on said second network, wherein defining the maximum number comprises:
 storing in a non-transitory computer-readable medium values of the maximum number of possible simultaneous accesses as a function of the bandwidth on the second network;
 retrieving a current bandwidth on the second network; and
 retrieving the value of the maximum number corresponding to the retrieved current bandwidth on the second network; and
 for at least one of the received requests, granting or refusing the request for access based on the defined maximum number.

2. The method as claimed in claim 1, wherein the number varies over time as a function of the state of all or part of physical and/or software resources contributing to communication of data between a terminal of the plurality of terminals and the second network.

3. The method as claimed in claim 2, wherein the physical and/or software resource is a resource included in the mobile gateway, the resource being included in the following list: a processor, a battery, a storage memory.

4. The method as claimed in claim 1, wherein the maximum number varies as a function of the time of use of the mobile gateway.

5. The method as claimed in claim 2, wherein at least one connection in progress is disconnected if at least one of the physical and/or software resources is faulty.

6. The method as claimed in claim 5, wherein at least one of the terminals takes priority over other of the terminals, and wherein the disconnection concerns said other terminals.

7. A hardware computer-readable medium comprising a computer program stored thereon and including instructions for implementation of a method for managing use of a mobile gateway capable of interconnecting a first network and a second network, when this program is executed by a processor, wherein bandwidth on said second network varies over time, and wherein the method comprises:
 receiving by said mobile gateway from the first network, requests to access said second network from a plurality terminals, and
 defining, by said mobile gateway, a maximum number of possible simultaneous accesses by the terminals in said first network so as to provide a given quality of service, wherein the maximum number is independent of current simultaneous accesses by the terminals on the first network, and wherein the maximum number of possible simultaneous accesses varies over time as a function of the bandwidth on said second network, wherein defining the maximum number comprises:
 storing values of the maximum number of possible simultaneous accesses as a function of the bandwidth on the second network;
 retrieving a current bandwidth on the second network; and
 retrieving the value of the maximum number corresponding to the retrieved current bandwidth on the second network; and
 for at least one of the received requests, granting or refusing the request for access based on the defined maximum number.

8. A mobile terminal comprising:
 a non-transitory computer-readable medium;
 a gateway capable of interconnecting a first network and a second network, wherein bandwidth on said second network varies over time, said gateway being configured to receive, from said first network, requests to access said second network from terminals, said gateway defining a maximum number of possible simultaneous accesses in said first network in such a way as to provide a given quality of service, wherein the maximum number is independent of current simultaneous accesses by the terminals on the first network, and wherein the gateway comprises a module that makes the maximum number of possible simultaneous accesses vary over time as a function of the bandwidth on said second network by:

storing in the non-transitory computer-readable medium values of the maximum number of possible simultaneous accesses as a function of the bandwidth on the second network;

retrieving a current bandwidth on the second network; and retrieving the value of the maximum number corresponding to the retrieved current bandwidth on the second network; and said gateway being further configured to, for at least one of the received requests, grant or refuse the request for access based on the defined maximum number.

9. A mobile gateway comprising:

hardware memory storing computer-readable instructions; and a processor coupled to the hardware memory and configured by the instructions to interconnect a first network and a second network, wherein bandwidth on said second network varies over time, receive requests to access said second network from a plurality of terminals in the first network, and make a maximum number of possible simultaneous accesses to the second network via the mobile gateway vary over time as a function of the bandwidth on said second network, and wherein the maximum number is independent of current simultaneous accesses by the terminals on the first network, the processor being configured by the instructions to make the maximum number vary by:

storing in a non-transitory computer-readable medium values of the maximum number of possible simultaneous accesses as a function of the bandwidth on the second network;

retrieving a current bandwidth on the second network; and retrieving the value of the maximum number corresponding to the retrieved current bandwidth on the second network; and wherein the processor is further configured by the instructions to, for at least one of the received requests, grant or refuse the request for access based on the defined maximum number.

* * * * *